(12) United States Patent
Knebel et al.

(10) Patent No.: US 10,759,150 B2
(45) Date of Patent: Sep. 1, 2020

(54) WATERPROOF MEMBRANE WITH GOOD ADHESION TO CONCRETE

(71) Applicant: SIKA TECHNOLOGY AG, Baar (CH)

(72) Inventors: Gustl Knebel, Sempach (CH); Martin Eckl, Pfäffikon (CH)

(73) Assignee: SIKA TECHNOLOGY AG, Baar (CH)

( * ) Notice: Subject to any disclaimer, the term of this patent is extended or adjusted under 35 U.S.C. 154(b) by 750 days.

(21) Appl. No.: 14/422,306

(22) PCT Filed: Aug. 20, 2013

(86) PCT No.: PCT/EP2013/067296
§ 371 (c)(1),
(2) Date: Feb. 18, 2015

(87) PCT Pub. No.: WO2014/029763
PCT Pub. Date: Feb. 27, 2014

(65) Prior Publication Data
US 2015/0231863 A1    Aug. 20, 2015

(30) Foreign Application Priority Data
Aug. 20, 2012  (EP) ..................................... 12181011

(51) Int. Cl.
*B32B 27/08*  (2006.01)
*B32B 5/02*   (2006.01)
(Continued)

(52) U.S. Cl.
CPC ............. *B32B 27/08* (2013.01); *B32B 5/022* (2013.01); *B32B 7/12* (2013.01); *B32B 27/065* (2013.01);
(Continued)

(58) Field of Classification Search
CPC ............. Y10T 428/269; Y10T 428/273; Y10T 428/28; Y10T 428/2852; Y10T 428/2891;
(Continued)

(56) References Cited

U.S. PATENT DOCUMENTS 4,065,924 A    1/1978  Young
4,775,567 A *  10/1988 Harkness ................ B32B 11/04
                                                    428/40.3
(Continued)

FOREIGN PATENT DOCUMENTS

CN       102196902 A     9/2011
DE   10 2007 026 166 A1  12/2008
(Continued)

OTHER PUBLICATIONS

Place, Elsie et al., Synethtic Polymer Scaffolds for Tissue ENgineering, Chem. Soc. Rev, 2009, 38, 1139-1151.*
(Continued)

*Primary Examiner* — Jennifer A Gillett
(74) *Attorney, Agent, or Firm* — Dentons US LLP

(57) ABSTRACT

A waterproof membrane is described that includes a barrier layer and a functional layer. The functional layer can include a thermoplastic polymer that changes consistency under the influence of highly alkaline media, and an adhesive. The production and use of the membrane are also described. The functional layer of the membrane can be designed in the form of a film, a coating, or a nonwoven fabric. The fibers in the fabric can include a hard core that is surrounded by a polymer layer, is inert prior to coming into contact with liquid concrete and acts as a protective layer. Thus, the membrane is protected from premature aging and allows work to be performed with the seal in place. During the concreting process, i.e. when the functional layer comes into contact with liquid concrete, the polymer dissolves and thus
(Continued)

Figures 1A, 1B:
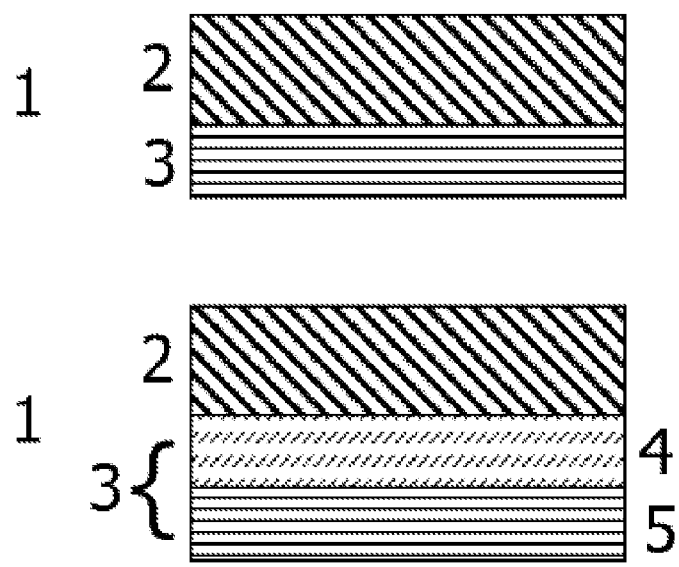

allows the adhesive to bond to the concrete. The functional layer thus acts as an adhesive sealing compound and the seal is leakproof.

24 Claims, 1 Drawing Sheet

(51) Int. Cl.
| | |
|---|---|
| B32B 27/30 | (2006.01) |
| B32B 27/06 | (2006.01) |
| B32B 7/12 | (2006.01) |
| B32B 27/36 | (2006.01) |
| B32B 27/12 | (2006.01) |
| C09J 7/22 | (2018.01) |
| C09J 7/30 | (2018.01) |
| B32B 27/40 | (2006.01) |
| B32B 37/24 | (2006.01) |

(52) U.S. Cl.
CPC ............ *B32B 27/12* (2013.01); *B32B 27/306* (2013.01); *B32B 27/36* (2013.01); *B32B 27/40* (2013.01); *B32B 37/24* (2013.01); *C09J 7/22* (2018.01); *C09J 7/30* (2018.01); *B32B 2260/021* (2013.01); *B32B 2260/046* (2013.01); *B32B 2274/00* (2013.01); *B32B 2307/712* (2013.01); *B32B 2307/7265* (2013.01); *B32B 2419/00* (2013.01); *C09J 2201/36* (2013.01); *C09J 2423/006* (2013.01); *C09J 2423/04* (2013.01); *C09J 2423/106* (2013.01); *C09J 2429/00* (2013.01); *C09J 2431/00* (2013.01); *C09J 2433/00* (2013.01); *C09J 2467/00* (2013.01); *C09J 2475/00* (2013.01); *Y10T 428/249983* (2015.04); *Y10T 428/269* (2015.01); *Y10T 428/273* (2015.01); *Y10T 428/28* (2015.01); *Y10T 428/2852* (2015.01); *Y10T 428/2891* (2015.01); *Y10T 428/2896* (2015.01); *Y10T 428/31565* (2015.04); *Y10T 428/31573* (2015.04); *Y10T 428/31663* (2015.04); *Y10T 428/31786* (2015.04); *Y10T 428/31797* (2015.04); *Y10T 428/31938* (2015.04); *Y10T 442/60* (2015.04)

(58) Field of Classification Search
CPC ..... Y10T 428/2896; Y10T 428/249983; Y10T 428/31565; Y10T 428/31573; Y10T 428/31663; Y10T 428/31786; Y10T 428/31797; Y10T 428/31938; B32B 27/08; B32B 27/306; B32B 27/32; B32B 27/26; B32B 2307/712; C09J 7/22; C09J 7/241; C09J 7/243; C09J 7/30; C09J 7/385; C09J 11/06; C09J 11/08; C09J 133/14; C09J 133/04; C09J 135/02; C09J 2201/61; C09J 2205/114; C09J 2423/106; C09J 2467/00; C09J 2433/00
USPC .................................. 428/350, 351, 355 EN
See application file for complete search history.

(56) References Cited

U.S. PATENT DOCUMENTS

| | | | |
|---|---|---|---|
| 5,313,848 A | 5/1994 | Santin et al. | |
| 5,397,614 A * | 3/1995 | Patnode | C09J 133/062 428/41.5 |
| 5,496,615 A | 3/1996 | Bartlett et al. | |
| 2003/0226637 A1* | 12/2003 | David | C04B 41/4515 156/212 |
| 2005/0032450 A1* | 2/2005 | Haggard | D01D 5/36 442/327 |
| 2005/0137303 A1* | 6/2005 | Shelby | C08L 67/02 524/284 |
| 2005/0196590 A1* | 9/2005 | Seth | B32B 25/04 428/174 |
| 2010/0084092 A1* | 4/2010 | Curet | C08F 287/00 156/334 |
| 2010/0307658 A1* | 12/2010 | Galush | B32B 27/08 156/71 |
| 2011/0217528 A1* | 9/2011 | Wiercinski | C09J 7/02 428/213 |

FOREIGN PATENT DOCUMENTS

| | | |
|---|---|---|
| EP | 2299005 A1 | 3/2011 |
| EP | 2415688 A1 | 2/2012 |
| WO | 01/40395 A1 | 6/2001 |
| WO | 2010/048198 A1 | 4/2010 |
| WO | 2011/041263 A1 | 4/2011 |

OTHER PUBLICATIONS

English Translation of International Preliminary Report on Patentability dated Feb. 24, 2015 corresponding to International Patent Application No. PCT/EP2013/067296, 10 pages.
Office Action, and English Translation of Office Action dated Mar. 1, 2016 corresponding to Chinese Patent Application No. 201380042788. 6, 16 pages.
Office Action, and English Translation of Office Action dated Nov. 10, 2016 corresponding to Chinese Patent Application No. 201380042788.6, 10 pages.
Office Action, and English Translation of Office Action dated May 26, 2017 corresponding to Chinese Patent Application No. 201380042788.6, 6 pages.
English Translation of International Search Report dated Oct. 21, 2013 corresponding to International Patent Application No. PCT/EP2013/067296, 3 pages.
Office Action dated Mar. 28, 2018 corresponding to European Patent Application No. 13755997.7, 4 pages.
Jürgen Schawe, "Evaluation and Interpretation of Peak temperatures" (German: Aus-wertung und Interpretation von Peaktemperaturen bei DSC-Kurven: Grundlagen), UserCom. Jan. 1, 2006 (Jan. 1, 2006), pp. 1 to 9, XP055389481, Found on the Internet: URL:https://www.mt.com/dam/mCexCfiles/Editorial/Simple/O/peaktemperaturentausercom23ds0609.pdf, [Found on Jul. 10, 2017].
Karsten Beutner et al., "Polyethylene terephthalates" (German: Polyethylenterephthalate), Römpp online Version 4.0, Dec. 1, 2009 (Dec. 1, 2009), p. 1 to 3, XP055462051, Found on the Internet: URL:https://roempp.thieme.de/roempp4.0/do/data/RD-16-03258, [Found on Mar. 22, 2018].
European Office Action dated Sep. 11, 2019 in corresponding European Patent Application No. 13755997.7, 5 pages.
European Office Action dated Jun. 3, 2020 in corresponding European Patent Application No. 13755997.7, 5 pages.

\* cited by examiner

WATERPROOF MEMBRANE WITH GOOD ADHESION TO CONCRETE

CROSS-REFERENCE TO PRIOR APPLICATIONS

This application is a National Stage of PCT/EP2013/067296, filed Aug. 20, 2013, and designating the United States (published on Feb. 27, 2014, as WO 2014/029763A1), which claims priority under 35 U.S.C. § 119 to European Patent Application No. 12181011.3, filed Aug. 20, 2012, each hereby expressly incorporated by reference in its entirety and each assigned to the assignee hereof.

TECHNICAL FIELD

The invention relates to a waterproof membrane comprising a sealing layer and a functional layer. The invention further relates to a method for waterproofing subsurfaces and to a method for producing a waterproof membrane.

PRIOR ART

Waterproof membranes are known in the construction industry for waterproofing subsurfaces against water penetration. For example, U.S. Pat. No. 4,065,924 describes a sealing layer connected to an upper layer, wherein the sealing layer is arranged on the subsurface, and the upper layer ensures the formation of a bond with the applied concrete in that said upper layer is permeated by the applied concrete.

However, such seals have the disadvantage that, over time, hollow spaces can form between the upper layer and the sealing layer due to a separation of the layers from one another or as a result of material fatigue. Fluids can then spread through these hollow spaces. If a leak develops in the sealing layer, for example due to roots growing in, material fatigue or tensile or shear forces, water that penetrates the sealing layer can then flow behind the sealing layer through these contiguous hollow spaces. As a result, large areas of penetrating water can form, hampering a precise localization of the leak.

It is further known from U.S. Pat. No. 5,313,848 that contact with a subsurface, in particular a concrete subsurface, can be improved by using a membrane that comprises a sealing layer, a layer of synthetic adhesive applied thereto, and finally a protective layer. Membranes of this type allow liquid concrete to be applied to the membrane and are particularly suitable for use in applications in which later installation on a cast concrete surface is not possible.

U.S. Pat. No. 5,496,615 describes a development of these membranes in which the side of the carrier layer that faces the cement layer has an added layer of adhesive, with which the carrier layer can be bonded to the concrete. This membrane structure ensures a better bond with the concrete layer.

However, the disadvantage of this design is that the adhesive layer can become soiled with dust and other particulate material before the concrete layer is applied, particularly if work is performed on the membrane after it has been installed. This can substantially reduce the adhesive capacity of the adhesive layer, such that a stable bond between the membrane and the concrete can no longer be ensured, particularly over extended periods of time.

EP 2 299 005 A1 describes waterproof membranes having a contact layer that comprises an adhesive material and a contact agent. Proposed contact agents are particularly fibrous materials comprising natural or synthetic fibers, such as polyethylene terephthalate, which can be permeated by concrete. Once the concrete has cured, the meshing of the contact agent with the concrete results in a secure bond. In this system, the adhesive serves to secure the contact agent to the membrane.

WO 2011/041263 A1 describes a waterproof membrane comprising a waterproof layer, a pressure sensitive adhesive applied thereto, and a protective layer of polyvinyl acetate. The protective layer in this membrane serves to protect the pressure sensitive adhesive, so that the membrane can tolerate foot traffic during construction. However, when concrete is poured onto the protective layer, the polyvinyl acetate hydrolyzes under the influence of the concrete to form polyvinyl alcohol, which is soluble in concrete. The pressure sensitive adhesive, which is located underneath the protective layer, is thereby exposed and can react with the poured concrete and form a secure bond.

DESCRIPTION OF THE INVENTION

The object of the present invention is to improve the waterproof membrane known from the prior art as described above, wherein soiling of the adhesive layer to be applied to the cement layer is prevented to the greatest possible extent during construction, and at the same time, once the liquid concrete is applied, a stable bond with the concrete layer can be achieved.

According to the invention, this is achieved by the waterproof membrane according to claim 1.

The main concept of the invention is that the functional layer contains a thermoplastic polymer which changes consistency under the influence of a highly alkaline medium, and an adhesive.

A highly alkaline medium is understood as having a pH of 9 to 14, preferably of 12 to 13.

The thermoplastic polymer preferably changes consistency under the influence of a highly alkaline medium such that, after the change in consistency, the adhesive can deploy a pressure sensitive adhesive action, which is not the case prior to the change in consistency. This can be accomplished, for example, by dissolving the thermoplastic polymer in the highly alkaline medium, which allows the adhesive to bond, for example, to liquid concrete. A pressure sensitive adhesive action is understood to mean that an adhesive bond is created without the use of heat, water and solvents to activate the adhesive, i.e., by applying pressure to bring the adhesive into contact with the substrate.

The functional layer is preferably inert to aqueous solutions that have a pH value in the acid to slightly basic range (such as rain, for example), whereas when it comes into contact with highly alkaline solutions, such as liquid concrete, for example, a chemical reaction occurs, resulting in a release of the adhesive.

An acid to slightly basic range is understood as a pH range of 4 to 8.

The advantages of the invention include the fact that work can be performed with the films according to the invention under adverse weather conditions without diminishing the adhesive capacity of the membrane. As a result, dirt and dust are prevented from being deposited with the liquid concrete on the contact surface, for example, and reducing the adhesive capacity of the membrane to the concrete.

The structure and the form of the functional layer are not subject to any special restrictions; the functional layer can be in the form of a film, a coating or a nonwoven fabric.

In addition to the described thermoplastic polymer, the functional layer can contain additional components that have a low melting point, for example, additional thermoplastics, which tend to lower the melting point, fillers, or concrete constituents, which improve bonding to the concrete.

Further aspects of the invention relate to methods for waterproofing subsurfaces and to methods for producing the described membranes. Particularly preferred embodiments of the invention are the subject matter of the dependent claims.

EMBODIMENTS OF THE INVENTON

FIG. 1A shows a waterproof membrane 1 according to the invention, comprising a sealing layer 2 and a functional layer 3, wherein the functional layer contains a thermoplastic polymer which changes consistency under the influence of highly alkaline media, and contains an adhesive.

FIG. 1B shows a membrane 1 according to the invention, which has a layer of adhesive 4 between the sealing layer 2 and a layer of a thermoplastic polymer 5, wherein the layer of adhesive and the thermoplastic polymer together form the functional layer 3, and said adhesive layer connects the sealing layer to the functional layer.

A "low melting point" in the context of polymers within the scope of the present invention is understood as a melting point ranging from 50 to 190° C.

The sealing layer 2 preferably comprises a material that guarantees adequate seal tightness, even at high liquid pressures.

It is therefore advantageous for the sealing layer 2 to be highly resistant to water pressure, and to score high in tear propagation tests and perforation tests, which is particularly advantageous under exposure to the mechanical loads that occur on construction sites.

It is particularly advantageous for the sealing layer 2 to comprise a thermoplastic layer, preferably a layer of thermoplastic polyolefins or polyvinyl chloride (PVC), in particular a layer of polypropylene (PP) or polyethylene (PE), particularly preferably polypropylene, since these materials ensure high resistance to environmental factors.

The sealing layer 2 is preferably chosen from materials from the group comprising high-density polyethylene (HDPE), medium-density polyethylene (MDPE), low-density polyethylene (LDPE), polyethylene (PE), polyethylene terephthalate (PET), polystyrene (PS), polyvinyl chloride (PVC), polyamides (PA), ethylene/vinyl acetate copolymer (EVA), chlorosulfonated polyethylene, thermoplastic elastomers with an olefin base (TPE-O, TPO), ethylene propylene diene rubber (EPDM), and mixtures thereof.

The sealing layer 2 can have a thickness of 0.05-2 mm, preferably 0.07-1.5 mm, particularly 0.08-1.2 mm.

It is particularly advantageous for the sealing layer 2 to be a flexible plastic layer. This will allow the waterproof membrane 1 to be wound onto rolls, typically during production, and then easily applied to a subsurface.

The functional layer 3 is preferably in the form of a film, a coating or a nonwoven fabric, in which the fibers comprise a hard core which is surrounded by a layer of the thermoplastic polymer.

Thermoplastic polymers that change their consistency under the influence of highly alkaline media are routine to a person skilled in the art. One example of such polymers is polyvinyl alcohols, which partially dissolve under the influence of aqueous media. Such vinyl alcohols are used, for example, for producing "soluble bags" for packaging concrete additives, since these "soluble bags" can be added directly to concrete mixtures. Once the polyvinyl alcohol films have dissolved, the concrete additives contained therein mix with the concrete.

Another example of polymers that change consistency under highly alkaline conditions is copolyesters, since the ester functionality of these polymers hydrolyze in highly alkaline media, causing the polymers to break down.

A further example of polymers that change consistency under the influence of highly alkaline media is polyvinyl acetates and copolymers thereof, since the vinyl acetate units within the polymers are subject to hydrolysis in highly alkaline media, and are thereby converted to polyvinyl alcohols. These, in turn, are readily soluble in water, so that the polymer dissolves completely in the highly alkaline medium.

In connection with the present invention, it is preferable for a polyvinyl alcohol, a thermoplastic copolyester or a copolymer of vinyl acetate to be used as the thermoplastic polymer that changes consistency under the influence of highly alkaline media. A preferred thermoplastic copolyester is based on copolyethylene terephthalate.

Suitable polyvinyl alcohols include those having a hydrolysis degree of more than 50 mol % (i.e. 50.1 to 100 mol % and particularly 70 to 100 mol %), preferably 85 to 100 mol %, and particularly 90 to 100 mol %. Corresponding polymers are described in DE 10 2007 026 166 A1, for example. The degree of hydrolysis (degree of saponification) indicates the percentage of a polyvinyl acetate base molecule that is saponified to polyvinyl alcohol. The degree of hydrolysis H is calculated from the number of residual acetyl groups and therefore from the ester number (EN) using the following formula, and is indicated as mol %:

$$H=100\times(100-0.1535\times EN)/(100-0.0749\times EN).$$

The polyvinyl alcohol polymer is preferably used in a form in which the polymer will not dissolve under the influence of neutral water and at room temperature, but will dissolve at a somewhat elevated temperature and under the influence of alkaline media. It is therefore advantageous for the polyvinyl alcohol to be present in not fully hydrolyzed form.

It is critical for the copolymers of vinyl acetate to not contain an overly high percentage of non-polar monomers, such as ethylenes. An overly high percentage of such non-polar monomers would result in a lack of substantial change in the consistency of the material when it comes into contact with liquid concrete, for example because there are too many non-polar side groups on the surface of the material, while the vinyl acetate units are shielded from contact with the concrete. Thus ethylene vinyl acetate copolymers having vinyl acetate concentrations ranging from 5 to 40 mol % vinyl acetate, for example, are not suitable for use as the thermoplastic polymer that changes consistency under the influence of highly alkaline media because partial hydrolysis will not alter the properties of the polymer enough for the polymer to dissolve in the aqueous medium. Within the scope of the present invention, suitable copolymers of vinyl acetate include only those that contain a maximum percentage of non-polar monomers of 50 mol %, referred to the total molar mass of all monomers in the polymer. The percentage of non-polar monomers is preferably no more than 30 mol %, more preferably no more than 20 mol %, and particularly preferably no more than 10 mol %. Non-polar monomers within the scope of the present invention are understood as monomers based on hydrocarbons, for example.

Obviously, there is no overlap between the thermoplastic polymer that changes consistency under the influence of highly alkaline media and the material that forms the sealing layer, since the material that forms the sealing layer must not become damaged if it should inadvertently come into contact with concrete. Therefore, polymers that are inert to highly alkaline media are preferably used as the material for the sealing layer.

The most preferable thermoplastic polymers that change consistency under the influence of highly alkaline media are thermoplastic copolyesters, for example, thermoplastic copolyesters based on polyethylene terephthalate. This polymer type has the advantage over polyvinyl acetate or copolymers thereof that hydrolysis takes place in the side chain of the polymer, whereas with polyvinyl acetate, only the side chains of the polymer are hydrolyzed. Therefore with copolyesters it is possible to achieve a very substantial change in consistency with a relatively low number of hydrolyses, while with polyvinyl acetate, essentially a complete hydrolysis of the acetate groups is necessary in order to achieve this result.

Within the scope of the present invention, it is also preferable for the thermoplastic polymer to have a low melting point, as defined above. It is particularly preferable for the thermoplastic polymer to have a melting point ranging from 60 to 120° C., particularly 70 to 90° C.

In addition to the thermoplastic polymer, the functional layer can contain an additional thermoplastic polymer. It is not necessary for this additional polymer to change consistency in highly alkaline media, and it is even preferable if this is not the case. Advantageously, said additional polymer is a temperature-stable thermoplastic or a thermoplastic elastomer that is stable at room temperature. In the present document, the term "room temperature" is understood as a temperature of 23° C. The thermoplastic polymer advantageously comprises a polymer chosen from the group comprising a) ethylene/alkyl acrylate copolymers, preferably ethylene/methyl acrylate-, ethylene/ethyl acrylate- or ethylene/N-butyl acrylate copolymers, b) polyethylenes, preferably produced by means of the metallocene method, particularly preferably copolymers of ethylene and octene or ethylene and hexene, and c) ethylene vinyl acetate (EVA). In a particularly preferred embodiment, the additional thermoplastic polymer is ethylene vinyl acetate (EVA), which can be used to lower the melting point of the copolyester polymer in the functional layer and which results in a reduction in adhesive capacity. In a further particularly preferred embodiment, the additional thermoplastic polymer is an ethylene/methyl acrylate, ethylene/ethyl acrylate or ethylene/N-butyl acrylate copolymer. These copolymers reduce the melting point of the polymer in the functional layer (3) and therefore decrease the adhesive capacity of the functional layer.

The volume of these additional thermoplastic polymers should be sufficient to produce the desired effect, but not so great that the property of the change in consistency in highly alkaline media is impaired. This is particularly critical if the additional thermoplastic polymer does not change consistency in highly alkaline media. It is therefore expedient for the percentage of additional thermoplastic polymers that do not change consistency in highly alkaline media to be a maximum of 40 wt %, referred to the total weight of thermoplastic polymers. Preferably, the percentage of additional thermoplastic polymers is no more than 30 wt %, particularly preferably no more than 20 wt % and most preferably no more than 10 wt %.

As described above, in addition to the thermoplastic polymer, the functional layer contains an adhesive. This adhesive and the thermoplastic polymer can together form the functional layer 3, wherein the adhesive is preferably combined with the thermoplastic polymer in such a way that it has no pressure sensitive adhesive effect in the mixture. In another embodiment, however, the adhesive can be embodied as a layer that is arranged between the sealing layer 2 and a layer of the thermoplastic polymer, and together with these, forms the functional layer 3. The adhesive is preferably a thermoplastic that is stable at room temperature, or a thermoplastic elastomer that is stable at room temperature. Thermoplastic elastomers have the advantage that the adhesive has good elasticity in relation to horizontal and vertical displacements, particularly in relation to displacements of the sealing layer 2 relative to the functional layer 3. Good elasticity of the adhesive prevents the layers from tearing or separating, and therefore prevents a failure of the adhesive. Ideally, the adhesive has a tear resistance cjb of 1.5-20 MPa at room temperature and/or an elongation at break sr of 5-1000%, both measured according to DIN ISO 527-1, from 1996.

Preferred thermoplastics and thermoplastic elastomers are particularly chosen from the group comprising polyethylene (PE), low-density polyethylene (LDPE), ethylene/vinyl acetate copolymer (EVA), polybutene (PB); thermoplastic elastomers with an olefin base (TPE-O, TPO) such as ethylene propylene diene/polypropylene copolymers; cross-linked thermoplastic elastomers with an olefin base (TPE-V, TPV); thermoplastic polyurethanes (TPE-U, TPU) such as TPU with aromatic hard segments and polyester soft segments (TPU-ARES), polyether soft segments (TPU-ARET), polyester and polyether soft segments (TPU-AREE) or polycarbonate soft segments (TPU-ARCE); thermoplastic copolyesters (TPE-E, TPC) such as TPC with polyester soft segments (TPC-ES), polyether soft segments (TPC-ET), or with polyester and polyether soft segments (TPC-EE); styrene block copolymers (TPE-S, TPS) such as styrene/butadiene block copolymer (TPS-SBS), styrene/isoprene block copolymer (TPS-SIS), styrene/ethylene butylene/styrene block copolymer (TPS-SEBS), styrene/ethylene propylene/styrene block copolymer (TPS-SEPS); and thermoplastic copolyamides (TPE-A, TP A).

Further advantageous adhesives can be chosen from the group comprising acrylate compounds, polyurethane polymers, silane-terminated polymers and polyolefins.

Preferred acrylate compounds are particularly acrylate compounds based on acrylic monomers, particularly acrylic and methacrylic acid esters.

The term "polyurethane polymers" encompasses all polymers that are produced according to the so-called diisocyanate polyaddition method. This includes polymers that are nearly or completely free of urethane groups. Examples of polyurethane polymers include polyether polyurethanes, polyester polyurethanes, polyether polyureas, polyureas, polyester polyureas, polyisocyanurates and polycarbodiimides.

As mentioned above, it is further advantageous for the adhesive to be a hot-melt adhesive. This ensures a good bond and good adhesion of the adhesive to the sealing layer 2, or to any additional components of the waterproof membrane, thereby preventing separation of the adhesive.

Hot-melt adhesives are generally known to a person skilled in the art, and are described, for example, in CD Römpp Chemie Lexikon, version 1.0, Georg Thieme Verlag, Stuttgart, 1995.

It is further advantageous for the adhesive to have a melting point (determined according to the ring & ball method) of 50-190° C., particularly of 60-120° C., preferably of 70-90° C. This is particularly advantageous for the production of waterproof membranes 1, in which materials which are affected at high production temperatures are used for the sealing layer 2.

In addition to the thermoplastic polymer, the adhesive and the optional additional thermoplastic polymers, the functional layer can contain additional components, in particular concrete constituents and/or mortar constituents. Suitable concrete constituents and/or mortar constituents are, in principle, any materials that are used for producing concrete and/or mortar, in particular, cement particles. Suitable concrete constituents and/or mortar constituents include, for example, additives such as gravel or sand, and binders, such as non-hydraulic, latent hydraulic puzzolanic or hydraulic binders. These additives can be used to improve the bonding of the waterproof membrane to the cast concrete in its cured form. Preferred concrete constituents and/or mortar constituents are hydraulic binders, preferably chosen from the group comprising cement, mortar, gypsum, silica fume, fly ash and blast furnace sand, aluminum oxide trihydrate, silicon dioxide, alkaline or earth alkaline metal salts or a mixture thereof. The concrete constituents typically have an average particle size of 0.1-1000 µm, preferably of 2 to 500 µm.

The functional layer in the waterproof membrane can be present in the form of a film of the polymer and the adhesive, in the form of a coating of the polymer and the adhesive or in the form of a nonwoven fabric, in which the fibers comprise a hard core which is surrounded by a layer of the polymer and the adhesive.

If the functional layer is in the form of a film or coating, it is likewise possible for the film or the coating to be a foamed material. This has the advantage of improving the resistance of the material to intermittent stresses.

If the functional layer is in the form of a film, said film expediently has a thickness ranging from 0.05 to 1 mm, in particular 0.07 to 0.9 mm and particularly preferably 0.1 to 0.7 mm. If the functional layer is in the form of a coating, however, this coating is applied at a coating weight ranging from 10 to 500 g/m$^2$, particularly ranging from 50 to 300 g/m$^2$. For the further alternative that the functional layer is in the form of a nonwoven fabric, it expediently has a base weight ranging from 10 to 500 g/m$^2$, and particularly ranging from 20 to 300 g/m$^2$.

It is clear to a person skilled in the art that the precise thickness of the film, coating or nonwoven fabric to be incorporated into the membrane is also determined by whether the membrane has a two-layer construction (without a center layer of adhesive between the sealing layer and the functional layer), a three-layer construction with an adhesive layer between sealing layer and functional layer or a construction having more than three layers. In a particularly preferred embodiment, the membrane according to the invention is a two-layer or three-layer membrane.

In the case of a two-layer construction, it is preferable for the film to have a thickness ranging from 0.2 to 0.7 mm, particularly from 0.4 to 0.6 mm. If the functional layer is a coating, it is preferable for said coating to be applied in a coating weight ranging from 150 to 350 g/m$^2$, particularly from 200 to 300 g/m$^2$. If a nonwoven fabric is used as the functional layer, the base weight for a two-layer construction is preferably 150 to 350 g/m$^2$, and particularly 200 to 300 g/m$^2$.

If a three-layer construction is used, the thickness of the functional layer can be lower than with a two-layer construction. The thickness of the functional layer if said layer comprises a film preferably ranges from 0.1 to 0.4 mm, particularly from 0.15 to 0.3 mm. In the case of a coating, the coating weight can be reduced to a volume ranging from 50 to 200 g/m$^2$, particularly ranging from 80 to 150 g/m$^2$. In the case of a nonwoven fabric, it is sufficient for the base weight of the nonwoven fabric to be between 10 and 120 g/m$^2$, particularly between 30 and 80 g/m$^2$.

The fibers that form the base of the nonwoven fabric are made of organic or synthetic material. More particularly, they are cellulose cotton fibers, protein fibers or synthetic fibers. Preferred synthetic fibers are particularly fibers made of polyester or of a homopolymer or copolymer of ethylene and/or propylene, a polyamide or viscose. The fibers can be short fibers or long fibers, spun, woven or nonwoven fibers or filaments. The fibers can be directed or straight fibers. It can further be advantageous to use fibers that are different both in terms of geometry and in terms of composition in combination with one another.

The nonwoven fabric constructed of fibers can be produced by various methods that are known to a person skilled in the art. In general, the matrix fibers (made of a solid material) are first produced, and then a layer of the thermoplastic copolyester is applied to them. Fibers of this type are also known to a person skilled in the art under the name "Bico" (for bi-component) fibers.

The nonwoven fabric comprises interstices, which can be produced by suitable production methods. The interstices are preferably at least partially open and permit permeation of liquid concrete and/or adhesive.

It is further possible within the scope of the invention for the waterproof membrane to comprise additional functional layers, in particular layers of swellable materials and electrically conductive materials, such as are described in EP 2 299 005 A1, in [0057], [0058] and [0059] to [0063].

The invention further comprises a method for waterproofing subsurfaces, comprising the steps of i) applying a waterproof membrane (1), as specified above, to a subsurface, wherein the functional layer of the waterproof membrane is facing away from the subsurface, and ii) applying liquid concrete to the functional layer (3) of the waterproof membrane (1). "Liquid concrete" in this document is understood as concrete that has not yet been cured. The concrete can be part of a structure, in particular an above-ground or underground structure, for example a building, garage, tunnel, landfill, water retention pond, dike or an element for use in prefabricated construction.

The liquid concrete is usually cast onto and/or on the functional layer, and can react with the functional layer. If the functional layer is a nonwoven fabric, it is advantageous for the liquid concrete to fully permeate the functional layer. As the concrete cures, a substantially secure bond typically forms between the cured concrete and the functional layer and therefore with the waterproof membrane 1, particularly if the concrete in its liquid state has fully permeated the functional layer. This bond is further reinforced by the deployment of a pressure sensitive adhesive action by the contact of the nonwoven fabric with the liquid concrete.

Thus when the liquid concrete comes into contact with the functional layer, a chemical reaction with the thermoplastic polymer is triggered as a result of the highly alkaline pH level of the concrete, and this reaction leads to a breakdown of the polymer or to a dissolution of the polymer, thereby releasing the adhesive from the functional layer. This adhesive in its released form has a pressure sensitive adhesive action, and can therefore ensure strong adhesion between the functional layer and the cured concrete.

The invention further comprises a method for producing waterproof membranes, as described above, wherein the method involves applying a functional layer to a sealing layer. If the functional layer is a film, it can preferably be applied to the sealing layer or to a layer of adhesive inserted therebetween by lamination or bonding, particularly by bonding, to the sealing layer. If the functional layer is a coating, it can expediently be applied to the sealing layer or to a layer of adhesive that is applied to the sealing layer by hot-melt nozzle extrusion, hot-melt calendering, powder dispersion methods or spray lamination.

The waterproof membranes according to the present invention are expediently produced as continuous product, wherein the individual layers are attached to one another by calendering and/or lamination, particularly by lamination. The membranes are then wound onto rolls, for example.

The adhesive can be expediently applied to the sealing layer during production by slotted nozzle extrusion, by the powder dispersion method, by hot-melt calendering or by spray lamination, particularly by means of a powder dispersion method. The composition and the stability of the adhesive are preferably compatible with the temperatures used during production of the waterproof membrane 1.

Systems for producing membranes according to the invention are routine to a person skilled in the art. In the interest of completeness, reference is made here to the apparatus described in EP 2 299 005, which can be used within the scope of the present invention for producing membranes.

With the membranes according to the invention, foundations and other structures can be sealed to prevent seepage, and good bonding with the concrete can be achieved without additional pretreatment measures. The described functional layers of the webs of membrane are inert before coming into contact with liquid concrete, and therefore protect the web against premature aging and allow work to be performed with the seal in place. During concrete casting, i.e., when the membrane comes into contact with liquid concrete, the functional layer develops a pressure sensitive adhesive effect, thereby enabling good adhesion to the concrete. At the same time, the functional layer acts as a sealant, and protects the seal against seepage.

The two-layer construction of the membrane has the additional advantage that the design is substantially simpler, and that the application of an adhesive, for example in the form of a hot-melt adhesive, can be dispensed with. In this case, the sealant that is required to prevent seepage forms in-situ during concrete casting.

LIST OF REFERENCE SIGNS 1 waterproof membrane
2 sealing layer
3 contact layer
4 adhesive layer
5 layer comprising a thermoplastic polymer

The invention claimed is:
1. A waterproof membrane (1) comprising:
a two-layer membrane having a sealing layer (2), and a functional layer (3),
wherein the functional layer (3) is a single layer that comprises a mixture of both: (i) a thermoplastic polymer comprising a thermoplastic copolyester that changes consistency under the influence of a highly alkaline medium, and (ii) an adhesive when measured according to DIN ISO 527-1 having a tear resistance of 1.5 MPa to 20 MPa at room temperature and/or an elongation at break of 5% to 1000%,
wherein the adhesive is combined with the thermoplastic polymer in such a way that the adhesive has no pressure sensitive adhesive effect in the mixture, and when the functional layer comes into contact with liquid concrete having a high alkaline pH level, a chemical reaction with the thermoplastic polymer is triggered thereby releasing the adhesive.

2. The waterproof membrane (1) according to claim 1, wherein the functional layer (3) is in the form of a film, in the form of a coating, or in the form of a nonwoven fabric.

3. The waterproof membrane (1) according to claim 1, wherein the adhesive in the functional layer comprises an acrylate adhesive, a polyurethane adhesive, or a silane-terminated polymer adhesive.

4. The waterproof membrane (1) according to claim 1, wherein the thermoplastic polymer in the functional layer (3) is a mixture of thermoplastic polymers.

5. The waterproof membrane (1) according to claim 1, wherein the functional layer (3) is in the form of a foamed material.

6. The waterproof membrane (1) according to claim 1, wherein the functional layer (3) further comprises additional functional components.

7. The waterproof membrane (1) according to claim 1, wherein the sealing layer (2) comprises a thermoplastic polyolefin, a polyvinyl chloride, a polypropylene, or a polyethylene.

8. The waterproof membrane (1) according to claim 2, wherein the functional layer (3) is in the form of a film and has a thickness of 0.05 mm to 1.0 mm.

9. The waterproof membrane (1) according to claim 2, wherein the functional layer (3) is in the form of a coating and has a coating weight in the range of from 10 g/m$^2$ to 500 g/m$^2$.

10. The waterproof membrane (1) according to claim 2, wherein the functional layer (3) is in the form of a nonwoven fabric and has a base weight in the range of from 10 g/m$^2$ to 500 g/m$^2$.

11. A method for waterproofing subsurfaces, the method comprising the following steps:
i) applying the waterproof membrane (1) according to claim 1 to a subsurface, wherein the functional layer (3) of the waterproof membrane (1) is facing away from the subsurface, and
ii) applying liquid concrete to the functional layer (3) of the waterproof membrane (1).

12. A method for producing a waterproof membrane (1) according to claim 1, comprising: applying the functional layer (3) to the sealing layer (2).

13. The method according to claim 12, wherein the functional layer (3) is in the form of a film and is applied to the sealing layer (2) by lamination or bonding; or the functional layer (3) is in the form of a coating and is applied to the sealing layer (2) by hot-melt nozzle extrusion, hot-melt calendering, powder dispersion methods or spray lamination.

14. A method of sealing a structure, the method comprising sealing a surface of the structure with the waterproof membrane (1) according to claim 1.

15. The method according to claim 14, wherein the membrane (1) is bonded to the structure by applying liquid concrete.

16. The waterproof membrane (1) according to claim 4, wherein the mixture of thermoplastic polymers comprises ethylene vinyl acetate.

17. The waterproof membrane (1) according to claim 6, wherein the additional functional components are concrete constituents.

18. The waterproof membrane (1) according to claim 17, wherein the concrete constituents are concrete additives.

19. The waterproof membrane (1) according to claim 8, wherein the functional layer (3) is in the form of a film and has a thickness of 0.1 mm to 0.7 mm.

20. The waterproof membrane (1) according to claim 9, wherein the functional layer (3) is in the form of a coating and has a coating weight ranging from 50 g/m$^2$ to 300 g/m$^2$.

21. The waterproof membrane (1) according to claim 10, wherein the functional layer (3) is in the form of a nonwoven fabric and has a base weight ranging from 20 g/m$^2$ to 300 g/m$^2$.

22. The method according to claim 14, wherein the structure is an above-ground structure or underground structure.

23. The method according to claim 22, wherein the structure is selected from the group consisting of a building, a garage, a tunnel, a landfill, a water retention pond, a dike and an element for prefabricated construction.

24. The waterproof membrane (1) according to claim 1, wherein the (ii) adhesive is a hot-melt adhesive.

* * * * *